(12) United States Patent
Chang

(10) Patent No.: US 8,392,572 B2
(45) Date of Patent: Mar. 5, 2013

(54) METHOD FOR SCHEDULING CLOUD-COMPUTING RESOURCE AND SYSTEM APPLYING THE SAME

(75) Inventor: Liang-I Chang, Changhua County (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 347 days.

(21) Appl. No.: 12/838,727

(22) Filed: Jul. 19, 2010

(65) Prior Publication Data

US 2011/0202657 A1    Aug. 18, 2011

(30) Foreign Application Priority Data

Feb. 12, 2010  (TW) .............................. 99104658 A

(51) Int. Cl.
*G06F 15/173*    (2006.01)
(52) U.S. Cl. ...................................... 709/226
(58) Field of Classification Search ........... 709/224–226
See application file for complete search history.

(56) References Cited

U.S. PATENT DOCUMENTS

| | | | |
|---|---|---|---|
| 7,500,001 B2* | 3/2009 | Tameshige et al. ........... | 709/226 |
| 2003/0074387 A1* | 4/2003 | Tanaka .......................... | 709/103 |
| 2003/0105868 A1* | 6/2003 | Kimbrel et al. ............... | 709/226 |
| 2004/0010544 A1* | 1/2004 | Slater et al. ................... | 709/203 |
| 2005/0027864 A1* | 2/2005 | Bozak et al. .................. | 709/226 |
| 2005/0283784 A1* | 12/2005 | Suzuki .......................... | 718/100 |
| 2006/0168223 A1* | 7/2006 | Mishra et al. ................. | 709/225 |
| 2009/0276519 A1* | 11/2009 | Alimi et al. ................... | 709/224 |
| 2010/0005173 A1* | 1/2010 | Baskaran et al. ............. | 709/226 |
| 2010/0153960 A1* | 6/2010 | Youn et al. .................... | 718/104 |

* cited by examiner

*Primary Examiner* — Shirley Zhang
(74) *Attorney, Agent, or Firm* — Rosenberg, Klein & Lee

(57) ABSTRACT

Provided is a method for scheduling cloud-computing resource, and a system applying the method is herein disclosed. It is featured that the load history record becomes a basis to obtain a computing pattern for each computing node based on a request. The load history is the basis to predict the future computing capability, and accordingly to distribute the computing task. The cloud-computing capability can therefore be advanced. The method firstly receives a computing request. The request includes a number of computing nodes, a start time of computing, and a length of computing time. A computing resource table is established based on the load history for each node, and used to calculate availability and confidence. After that, a resource expectation value is obtained from the availability and confidence. After sorting the expectation values, one or more computing nodes are selected for further task distribution.

14 Claims, 5 Drawing Sheets

METHOD FOR SCHEDULING CLOUD-COMPUTING RESOURCE AND SYSTEM APPLYING THE SAME

BACKGROUND OF THE INVENTION

1. Field of the Invention

The present invention relates to a method for scheduling cloud-computing resource and a system for applying the same, more particularly to incorporate a load history record of each terminal computer to be a basis of resource scheduling for efficient cloud computation.

2. Description of Related Art

Grid computing implements a type of cloud computation that introduces a concept of utilization of the unused resource of computation. With regard to the large amount of computing request, the conventional technology generally utilizes the available resource of each idle terminal computer, especially the idle CPU time. With communication over the network, it is to perform a distributed computing. After the computation, each result of each node is sent back to a computation center over the network.

Reference is made to FIG. 1 which illustrates a schematic diagram of distribution of CPU resources in a grid computation. In this example, the two computer systems 101, 102, or more are interconnected with a grid-computation center 12 over a network 10. The CPU computing resources of the systems 101, 102 may be outputted over the network 10, especially used for executing the computing request launched from the grid-computation center 12.

Under this framework, the computer systems 101, 102 share their idle CPU cycles for performing the grid computation. During the operating process, the grid-computation center 12 needs to acquire status of each computer system 101 or 102 for acquiring the available computing resources.

The conventional technology acquires the available computing status of each project-joined terminal computer system through a Broker. Reference is made to FIG. 2 schematically showing a framework of the conventional grid computation. A grid serving manager 20 schedules the computation for a specific request. This framework primarily has three parts, including the client applications 21, 23, 25 submitting the computing requests, a grid serving manager 20 for monitoring and scheduling, and the grid engines 201, 202, 203, 204, 205 for providing computing resource of each terminal.

The client applications 21, 23, 25 launch their computing requests to the grid serving manager 20 through a driver (not shown). Each grid engine (201, 202, 203, 204, or 205 that may include the terminal computer system, workstation) reports the states of available resources to the grid serving manager 20 by a network monitoring mechanism. Further, the grid engine may notice the grid serving manager 20 or report the result to the manager 20 after finishing the specific task. Still further, the grid serving manager 20 may recognize the each grid engine's load through the monitoring mechanism. Therefore, the manager 20 may provide an optimized schedule of computation.

SUMMARY OF THE INVENTION

In view of above description, the conventional cloud-computation technology may be unstable and inefficient since it distributes the computing tasks based on each terminal's instant load, but not considers the future possible changes. The conventional technology may modify its usage of the computing resources by real-time monitoring, however it still meets problems with the unpredictable load of each terminal. The present invention, therefore, provides a method for scheduling cloud-computing resource. Preferably, the invention takes into consideration of load history record of each computing node in order to enhance the cloud-computing capability.

In one of the embodiments, a first step in the scheduling method is to receive a computing request, submitting the number of computing nodes, a start time of computing, and a length of computing time. A step in the method is then to collect the load history records from memories of the computing nodes, and to establish a computing resource table corresponding to a computing node. The table records a computing pattern by referring to load history. The computing pattern describes status of CPU of each node by time. The CPU load states are divided into several levels by time and form the computing pattern. In particular, the load history record also includes both the load status of CPU resource and the corresponding time.

The claimed method is then to calculate an availability of each computing node according to the computing request and computing pattern. The availability involves the information including the requested length of computation, and a start time of the computation. Next, while summing up the values of available resources whose load levels conform to the computing length, the availability is obtained. According to the computing request and the computing pattern, a confidence of each computing node is then calculated.

The availability and the confidence for each computing node are used to get an expectation value. As sorting the expectation values, computing nodes are selected for further distribution of computing task.

It is featured that the present invention introduces the concept of load history record of each computing node which forms a computing pattern, and a computing resource table is established based on the computing pattern. Since the system receives a computing request, the system may distribute the computing task to the nodes based on each node's load history.

DETAILED DESCRIPTION OF THE PREFERRED EMBODIMENTS

According to one embodiment of the method for scheduling cloud-computing resource and the system in accordance with the present invention, it is featured that the invention introduces a concept of the resource usage for each terminal computer for a period of time is a basis to determine the distribution of computing. Such as a load history record for a CPU, the record is to be a reference to distribute the computing task. In particular, the history record includes both the load status of CPU resource and the corresponding time, and provides a scheme of prediction of future for making a selection of computing resources. It also provides a more precise way to select the suitable computing resources. Therefore, the present invention may be more efficient to use the each resource, and enhance the performance of the cloud computation.

The computing resources applied to the cloud computation usually have their specific users. The loads for the computing resources may fluctuate with time. It is supposed that the every terminal resource's user or the relevant operation usually has his/its regular behavior, thereby the availability for each resource is predictable. In the present invention, the claimed method can find one or more suitable computing resources after a numerical analysis based on each user and the related resource's load history record.

Figure 1:
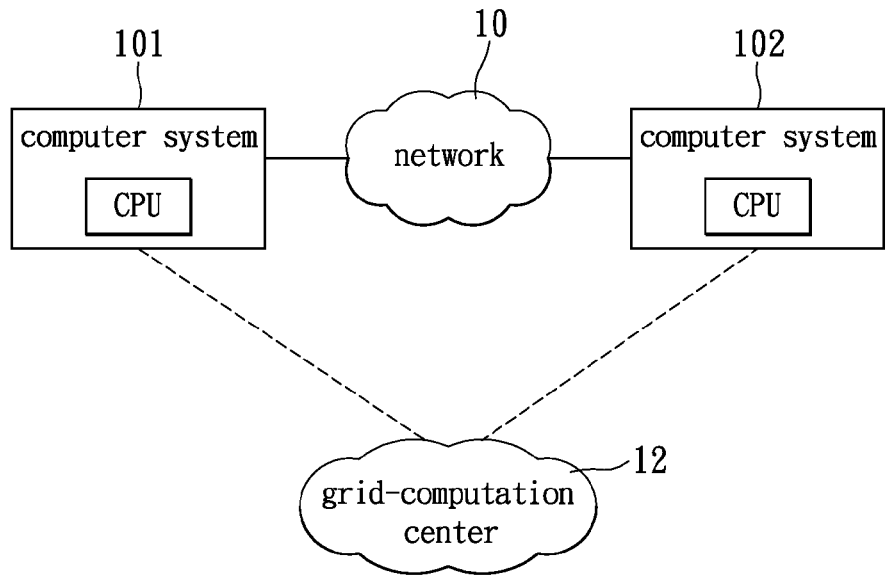
FIG. 1 shows a schematic diagram of prior grid computation.
Figure 2:
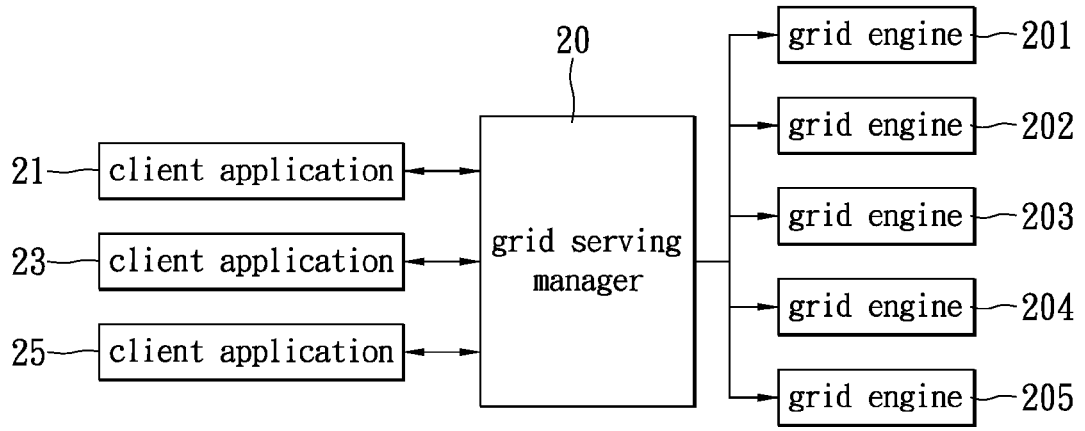
FIG. 2 is an architecture relating to a grid computation.
Figure 3:
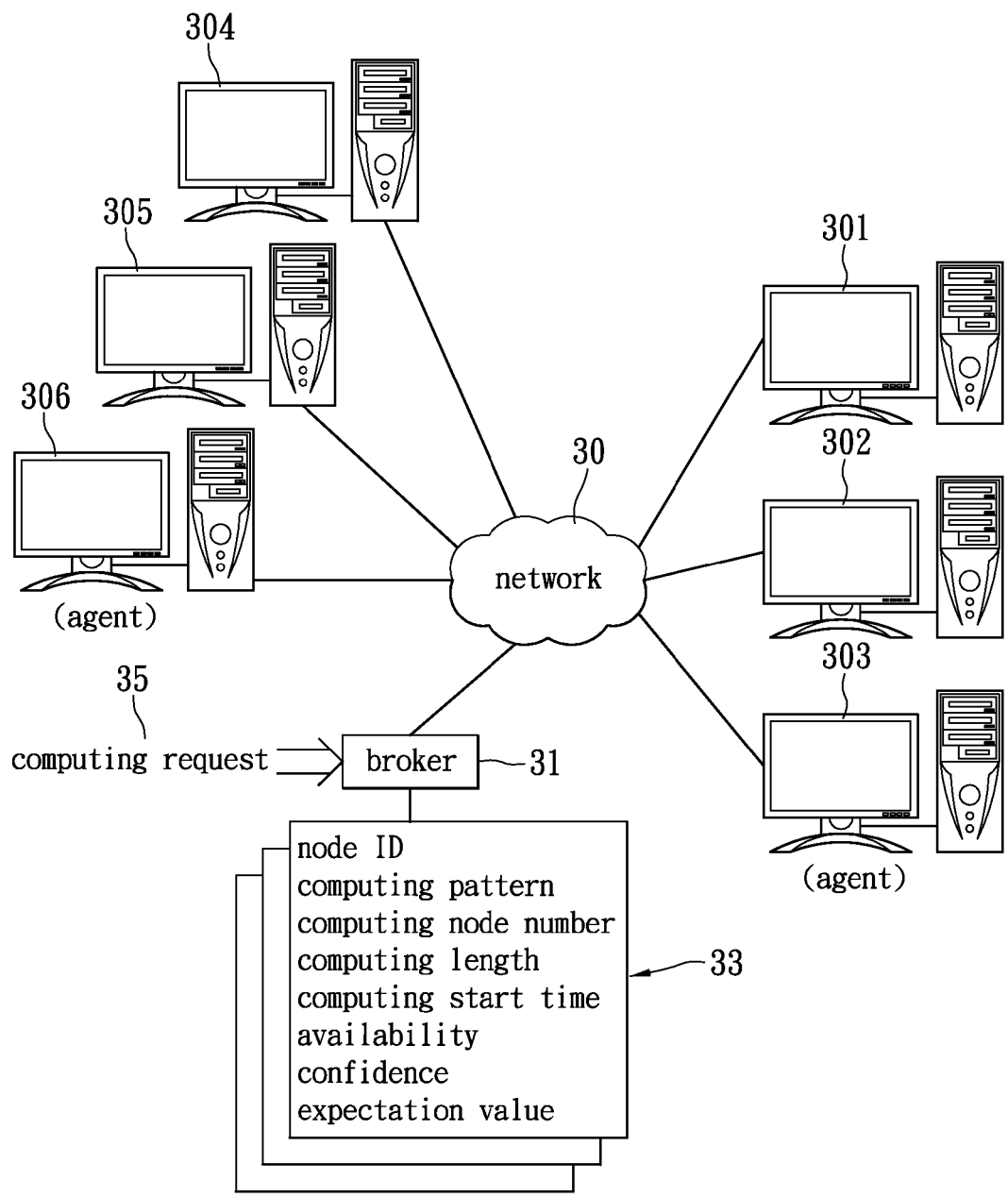
FIG. 3 shows a schematic diagram of the system applying the scheduling method in accordance with the present invention.

Reference is made to FIG. 3 illustrating the system applying the method. There are several terminal computers, preferably the computing nodes, 301, 302, 303, 304, 305, 306 disposed. Each terminal computer joins a computing project managed by a broker 31. In order to efficiently acquire the available resource of each terminal computer, the terminal computers may be divided into one or more groups. In this example, two groups are exemplarily provided. Each group, by time, collects each terminal computer's CPU load via an agent program. The relevant resource information may also be the status regarding the memory usage, input/output system usage, and the like.

The agent program records the load history record of each terminal computer's CPU, and establishes each computer's own computing resource table. The broker 31 then retrieves the computing resource table of each terminal computer in each group via the agent program. The tables may be buffered in a memory of the broker 31. The information is used to be the basis for further distribution of computing task.

According to the example shown in the figure, the terminal computers 301, 302, 303 belong to one group, and the terminal computers 304, 305, 306 belong to another one group. Each terminal computer has a pre-installed agent program, which collects the computer's resource usage with time. The resource information may relate to the CPU, memory, and I/O system. Preferably, the agent program in one terminal computer of each group further retrieves each terminal computer's load status. After that, the load status is referred to establish a computing resource table. Over the network 30, the broker 31 may retrieve each computing resource table of each terminal computer via the agent program in each group.

The mentioned broker 31 is preferably a cloud computation center which masters the joined terminal computers, and their load statuses. The broker 31 has a database for recording the load information of each computing node which is collected by the agent program. A computing pattern for each node is then built based on the load history. When the broker 31 receives a computing request 35, it may efficiently distribute the computing task to the nodes according to the resource requirements and the recorded information of computing resources.

The computing resource table mainly indicates a computing pattern wherein the load history records of the nodes are chronologically sorted by time. It is featured that the load status of CPU resource is divided into a plurality of load levels by time, and the load levels are further arranged based on the chronological order in order to obtain the computing pattern. The computing pattern also includes the information of each node's ID, preferably shown in FIG. 4, and each node's load levels at each period of time. The computing request 35 submits a number of the nodes, a start time and a computing length. The number of nodes is the required information that requests a certain number of the terminal computers. The number may precisely indicate the CPU number. The start time is the time to start the computation, and corresponds to the time recorded in the pattern of each node. The computing length may define the end time of the current computing task.

According to the above description of the computing pattern of each computing node, the claimed method needs to obtain the number of nodes, the start time and the computing length, and afterward to calculate a value of availability and a value indicating confidence of each node. The availability indicates the available level of a computing node, and the confidence shows the level of how the computing node matches up the computing request. Through the interrelationship of the availability and the confidence, an expectation value for each computing node is obtained. After sorting the expectation values of the joined nodes, the nodes with the higher rank of expectation values have the higher rank of matching with the computing request.

A resource parameter table 33 shown in FIG. 3 records the data in the database of the broker 31, in particular, the resource parameter table 33 included in the broker 31 is used for recording a node ID of each computing node and the computing pattern. The data includes the computing patterns for the computing nodes based on the load history records. The table 33 further records the obtained availability, confidence and expectation value which are calculated according to each computing request. Moreover, the plurality of computing nodes correspond to the plurality of resource parameter tables 33. The recorded expectation values may be the basis to select one or more joined computing nodes in accordance with the computing task.

Figure 4:
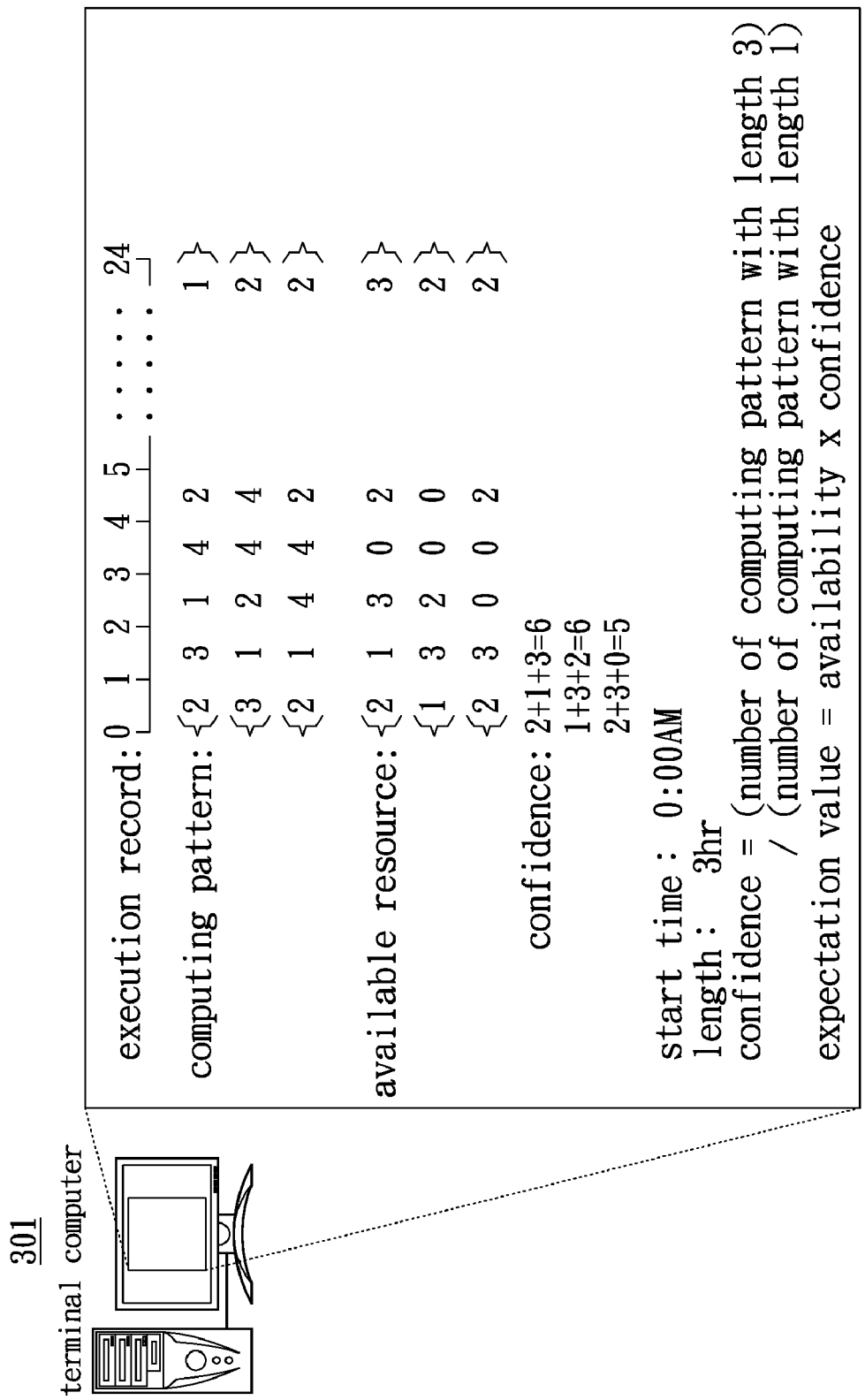
FIG. 4 shows a schematic diagram of the preferred embodiment implementing the scheduling method in accordance with the present invention.

Further reference is made to FIG. 4 showing a schematic diagram of the embodiment implementing the method. The present invention is not limited to the data described in the example. In the figure, for example, the load history record and the related parameters are retrieved from the terminal computer 301.

An execution record is firstly revealed. In the beginning, the invention is to analyze the history record of the terminal computer before executing a computing task. The execution record contains the resource load levels at different time points. In the current example, the numerals 0, 1, 2, . . . , 24 indicate the 24 hours a day, and the following data corresponds to each load level at each time point. That means the table shows the usage status of CPU of each computing node and its corresponding time point.

Furthermore, the CPU load may be divided into several load levels. The load levels may be sorted by time, and those arranged levels form a computing pattern of each computing node. In this example, the CPU load is divided into four levels. Number "0" indicates there is no CPU load; number "1" indicates it has 0 to 25% CPU load; number "2" indicates 25 to 50% CPU load; number "3" indicates it has 50% to 75% CPU load; and number "4" shows 75% to 100% CPU load.

Referring to the above mentioned data, the load levels of CPU form the computing pattern. The pattern shows that the load level is 2 at time 0 to 1 at first day; load level is 3 at time 1 to 2; load level is 1 at time 2 to 3; load level is 4 at time 3 to 4; and so forth. Based on these data regarding the load history record of computing node, it analogically figures out the load levels for plural time points of a plurality of days.

On the other hand, the above-described load levels can be interpreted as the available resource. For example of four levels, the load level "1" means the available resource could be "3" (four minus one is equal to three). Similarly, the load level "0" means the available resource could be "4"; the load level "2" means the available resource could be "2"; the load level "3" means the available resource could be "1"; and the load level "4" means the available resource could be "0".

As shown in the diagram, the load level {2, 3, 1, 4, 2, ..., 1} and its corresponding available resource {2, 1, 3, 0, 2, ..., 3} is at first day; the load level {3, 1, 2, 4, 4, ..., 2} and its corresponding available resource {1, 3, 2, 0, 0, ..., 2} is at second day; at third day, the load level {1, 1, 4, 4, 2, ..., 2} corresponds to available resource {1, 3, 0, 0, 2, ..., 2}, and so on to the rest of days. If the record continues for one month, the database may have the computing pattern recording 30 days and each having 24 hours data.

Since those available resources are derived, the availability in certain period of time may also be obtained. In accordance with the present invention, the availability is obtained by primarily referring to the parameters regarding to the computing request. In which, the computing length and start time of the computing request, and the load levels or their available resources in the computing pattern meeting the request are the main reference for obtaining the availability, preferably summing up the values of available resources. Such as the example shown in the figure, in an initial condition, the start time starts at 0 o'clock, and the computing length is 3 (3 hours for example). Thus, the availability can be expressed as the summation of the values of available resources from 0 o'clock to 3 o'clock. Therefore, the terminal computer 201 has an availability at first day with 6 (two plus one plus three), second day with 6 (one plus three plus two), and the third day with 5 (two plus three plus zero).

Next, the method is to calculate a confidence. The confidence describes how much the specific computing nodes meet the specific computing needs. In accordance with one of the embodiments of the present invention, the confidence equals to a value of a number of the computing pattern having a specific length divided by the number of the computing pattern having the length being 1. For example, if the target is to calculate the confidence of the terminal computer with computing pattern {2, 3, 0} as the computing length is 3, a number (set as first number) of the computing pattern {2, 3, 0} needs to be obtained firstly. Next, the step is to obtain the number (set as second number) of the computing pattern {2} with the same start time and first available resource "2" having length 1 with corresponding to the computing pattern {2, 3, 0}. After that, the first number and the second number are performed by a correlation operation, and therefore the confidence is obtained. In the embodiment, the confidence equals to the first number (numerator) divided by the second number (denominator).

After obtaining the availability and confidence under a certain condition of a specific start time and the computing length, an expectation value for the resource is then calculated. preferably, the expectation value equals to the availability multiplying the value of confidence. The higher expectation value is, the higher the computing node matches up the computing request. In one aspect of the distributed computing, one computing task may be distributed to plural difference computing nodes at the same time. Selection of the computing nodes may be based on sorting the expectation values.

A computing node has a computing pattern {23142} provided under a request of the computing length is 5. The pattern's availability is 8 (2+1+3+0+2), and its load level is 4. Within a certain period of time, there are 17 computing patterns which correspond with the pattern {23142}. At the same start time, the number of computing pattern {2} is 23. Therefore, the confidence of the computing pattern {23142} is 0.74, that is the number 17 divided by the number 23. Furthermore, the expectation value is 5.92, readily the availability 8 multiplying the confidence 0.74. The higher expectation value means the higher availability of the computing pattern.

Figure 5:
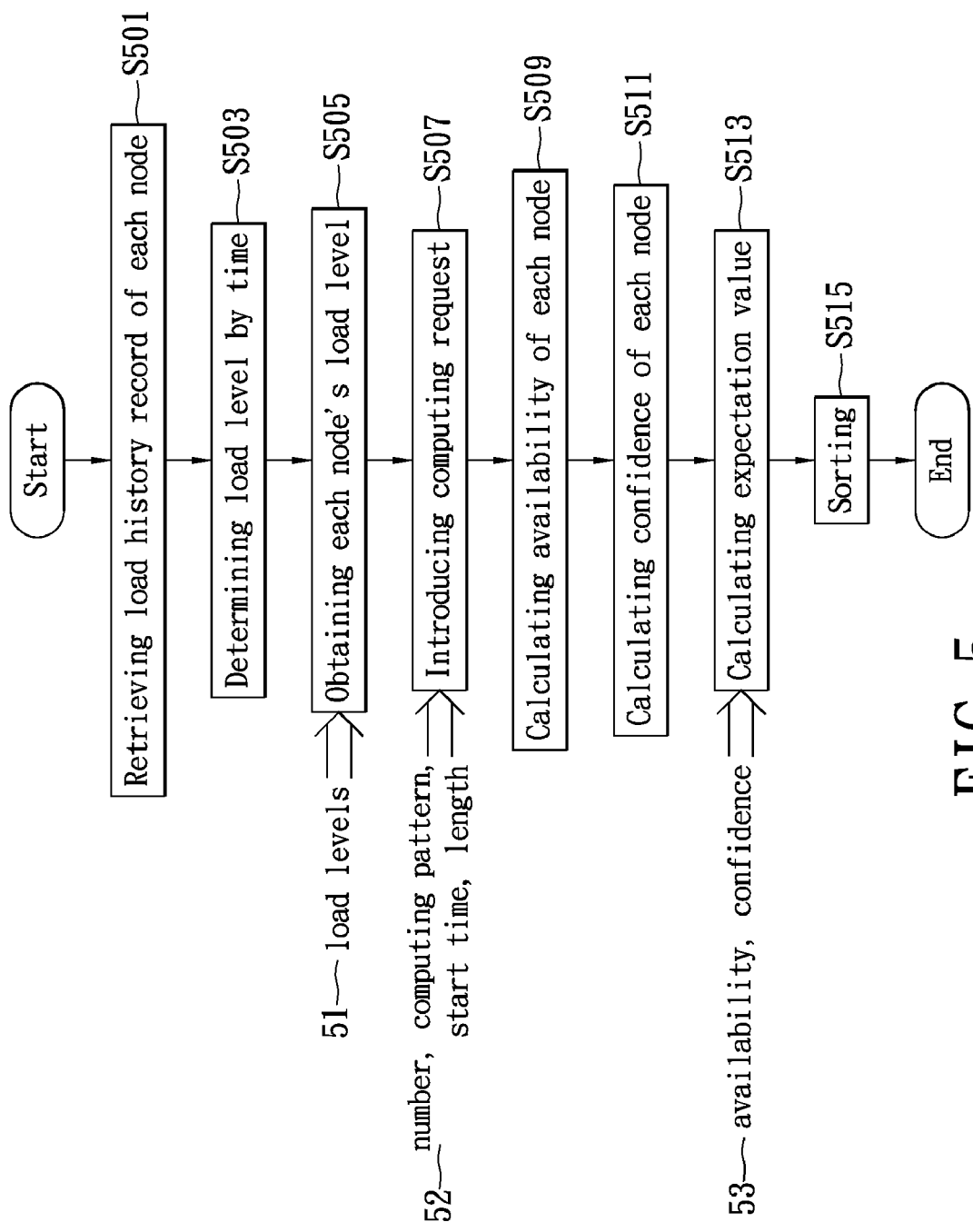
FIG. 5 is a flow chart illustrating the claimed scheduling method.

Reference is made to FIG. 5 illustrating a flow chart of calculating the expectation value in the method for scheduling cloud-computing resource.

In the beginning, each computing node has recorded its load history for a period of time via an agent program. Then a broker retrieves each node's load history record from the agent program. Those records are stored in a database (step S501), in particular, every load history record is stored in every node's memory. Based on scenario of division of the load levels, each node's load in accordance with the load history record may be divided into several load levels by time (step S503). Therefore, a computing pattern for each computing node can be obtained. Next, the method is to retrieve the load level (51) of each computing node, and to obtain each node's availability indicative of available resource illustrated in FIG. 4 (step S505).

Next, a system applying the described method receives a computing request (step S507). The computing request submits a computing number, a start time, and length with corresponding computing pattern (52) to the system. Therefore, the availability of each node is calculated (step S509), and the confidence thereof is also obtained (step S511).

In order to find the confidence, a number (the first number) of computing patterns which meet the computing length and start time of the computing request is firstly obtained. Next, another number (the second number) of the computing patterns which has the same start time but smaller computing length is obtained. For example, if the computing length is 3, the second number of the pattern having length 1 or 2 will be the denominator, and the first number is to be the numerator. The ratio of the first number to the second number is the confidence.

After introducing the availability and confidence (53), it is to get an expectation value (step S513). Every computing node may have more than one expectation value. For instance, a computing request in one day may correspond to an expectation value. After averaging the expectation values for days, the method then sorts the expectation values by size (step S515). One or more computing nodes may be selected according to both the computing request and the averaged expectation value of each computing node.

Figure 6:
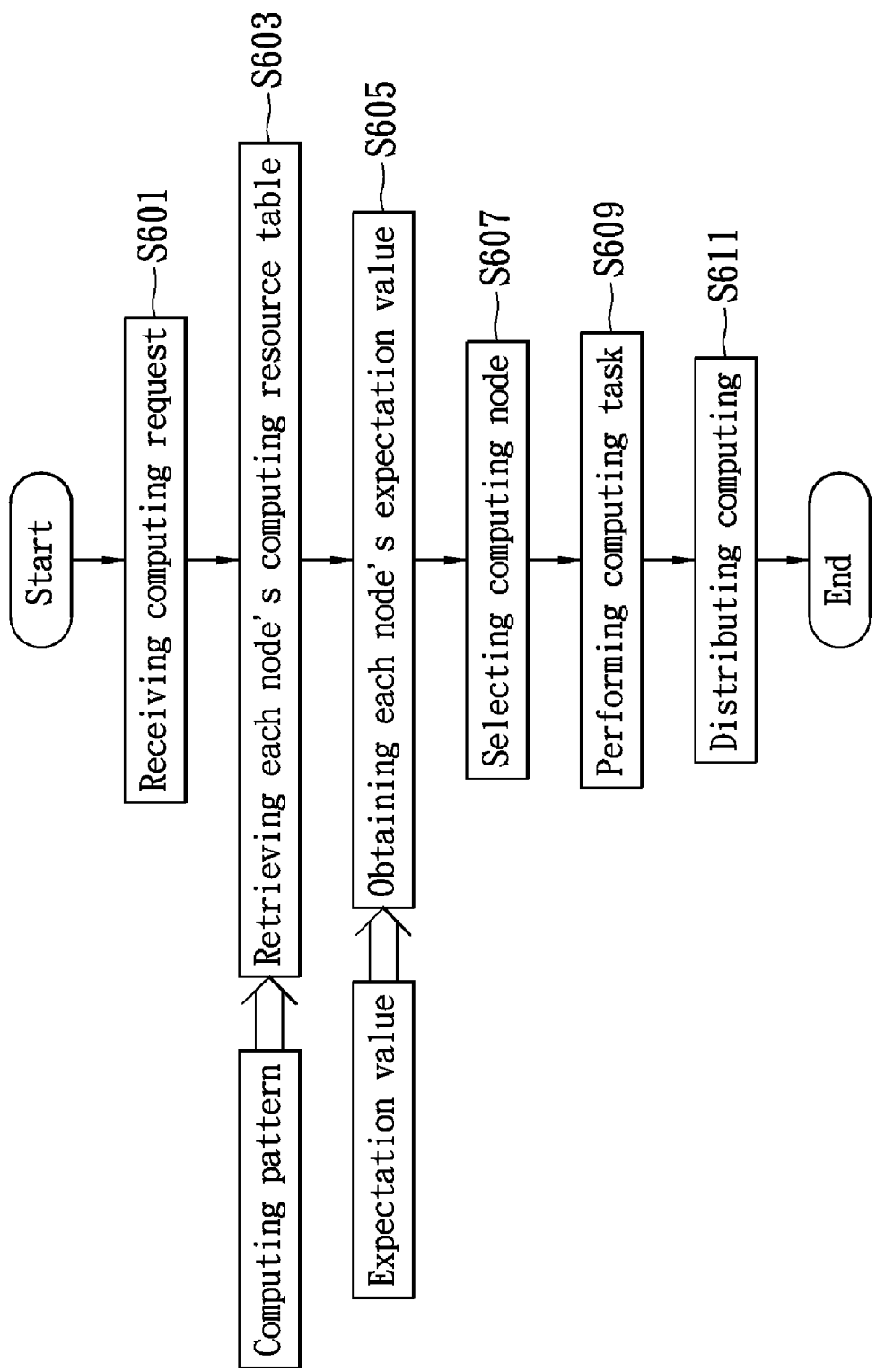
FIG. 6 shows a flow chart of the claimed scheduling method.

Based on the computing pattern for each node generated according to the flow chart illustrated in FIG. 5, the start time and computing length submitted in the computing request may correspond to one resource-related expectation value. This expectation value is applied to select the one or more computing nodes for performing the computing task. FIG. 6 shows a related flow chart embodying the method of the invention.

As the description in step S601 in FIG. 6, the step in the method is to receive a computing request. From a database, it's to retrieve the computing resource table of each computing node collected for a period of time. In the meantime, the step in the method is to introduce the computing pattern for each node (step S603). Through the flow performed in FIG. 5, the step is to obtain the expectation value related to each node by referring to the start time, computing length, and the number of nodes recorded in the request (step S605). It is noted that the way to select the computing pattern is based on the architecture of the cloud computation. In the current embodiment, after calculating the expectation values, the sizes of the values become a main basis of selection of the computing nodes (step S607). The higher the expectation value is, the higher the related node meeting the request.

After the selection of the nodes, the step in the method is launched to perform the computing task (step S609). According to the start time, length and number of nodes, the method is to distribute the task to the nodes. In the embodiment, the nodes are selected based on the sorting of expectation values by size. Then the task is distributed to those selected node over a network connecting means (step S611). Subsequently, the broker may integrate the results delivered from the plurality of computing nodes into a final result after finishing the node-end computations.

The above-mentioned descriptions represent merely the preferred embodiment of the present invention, without any intention to limit the scope of the present invention thereto.

What is claimed is:

1. A method for scheduling cloud-computing resource, comprising:
    receiving a computing request at least including a number of the computing nodes, a start time of computing, and a computing length;
    retrieving a computing resource table of each of a plurality of computing nodes, wherein the table buffered in a memory of a broker includes a computing pattern obtained from a load history record of each computing node, wherein every load history record is stored in every node's memory;
    calculating an availability of each computing node according to the computing request and the computing pattern, wherein the availability indicates the available level of the each computing node, and the availability is obtained by summing up values of available resources while any load level of the computing pattern conforms with the computing length;
    calculating a confidence of each computing node according to the computing request and the computing pattern, wherein the confidence shows the level of how the computing node matches up the computing request, and the confidence is obtained by:
        calculating a first number of the computing pattern conforming with the computing length and the start time;
        calculating a second number of the computing pattern conforming with the start time and smaller than the computing length; and
    the confidence equals to the first number divided by the second number;
    calculating an expectation value of each computing node and the expectation value equals to the confidence multiplied by the availability; and
    selecting one or more computing nodes according to the computing request and the expectation value of each computing node;
    executing a computing task; and
    distributing the computing task to the selected one or more computing nodes.

2. The method of claim 1, wherein, based on the number of computing nodes, one or more computing nodes are selected to perform the computing task.

3. The method of claim 2, wherein, further based on the expectation value of each computing node, the one or more computing nodes are selected.

4. The method of claim 1, wherein the plurality of computing nodes form a group, through an agent program, the load history record of each computing node is recorded.

5. The method of claim 4, wherein the broker retrieves the load history record recorded by the agent program over a network.

6. The method of claim 5, wherein the broker includes a resource parameter table for recording a node ID of each computing node and the computing pattern, and the broker is used to obtain a number of the computing nodes, a start time of computing, and a computing length in accordance with the computing request, and the availability and the confidence based on the computing request.

7. The method of claim 5, wherein the broker integrates results delivered from the plurality of computing nodes into a final result after finishing computations of the computing nodes.

8. The method of claim 1, wherein the load history record includes load status of CPU resource and the corresponding time.

9. The method of claim 8, wherein the load status of CPU resource by time is divided into a plurality of load levels and the load levels are arranged based on a chronological order in order to obtain the computing pattern.

10. The method of claim 1, wherein, while the second number is calculated, the computing length is 1.

11. A system for scheduling cloud-computing resource, comprising:
    a plurality of computing nodes, which is divided into one or more groups, and an agent program stored in memory of the each computing node of each group is executed to retrieve load information of each computing node and to build a computing resource table for each computing node;
    a broker having memory recording the computing resource table of each computing node retrieved by the agent program, wherein the broker at least includes a node ID and a computing pattern and a database recording the load information retrieved from the agent program of the each computing node, and receives a computing request including a number of the computing nodes, a computing length, and a start time of computing, and the broker distributes computing task to the plurality of computing nodes according to the computing request;
    wherein, the computing resource table records an availability, a confidence obtained according to the computing request, and an expectation value calculated based on the availability and the confidence, in which the availability indicates the available level of the each computing node, and the availability is obtained by summing up values of available resources while any load level of the computing pattern conforms with the computing length; the confidence shows the level of how the computing node matches up the computing request, and the confidence is obtained by:
    calculating a first number of the computing pattern conforming with the computing length and the start time; calculating a second number of the computing pattern conforming with the start time and smaller than the computing length; and the confidence equals to the first number divided by the second number; and
    the expectation value equals to the confidence multiplied by the availability;
    wherein, the computing nodes and the broker are connected over a network.

12. The system of claim 11, wherein the computing node is a terminal computer system.

13. The system of claim 11, wherein the load history record of each computing node is recorded by time, and the computing pattern for each computing node is established based on the load history record.

14. The system of claim 11, wherein the broker sorts the plurality of expectation values by size, and distributes computing task to the plurality of computing nodes over the network.

* * * * *